Figure 1:
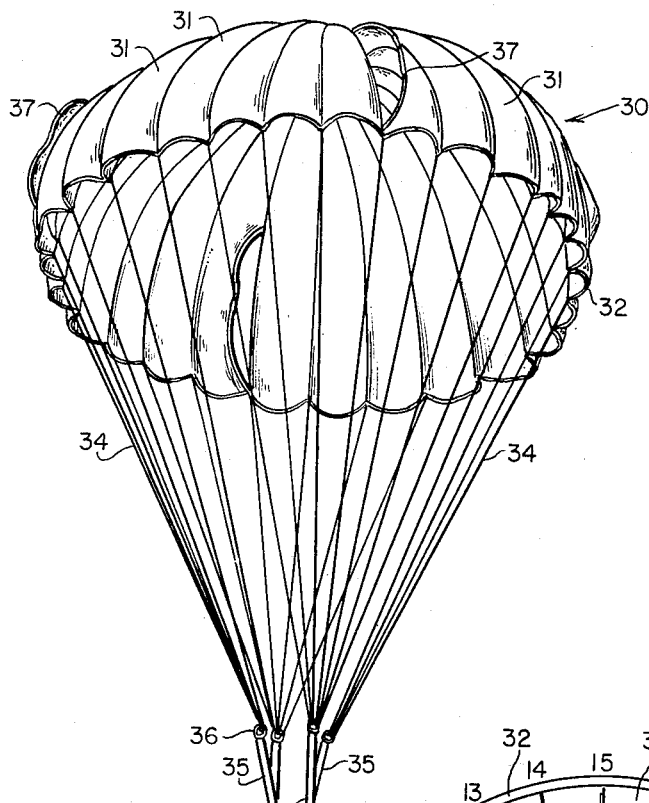

Feb. 23, 1960 J. A. ISTEL ET AL 2,925,971
NON-OSCILLATING, NON-STEERABLE PARACHUTE
Filed Aug. 5, 1957

INVENTORS
Jacques Andre Istel
Lewis Barton Sanborn
BY
Kane, Dalsimer and Kane
Attorneys.

United States Patent Office 2,925,971
Patented Feb. 23, 1960

2,925,971

NON-OSCILLATING, NON-STEERABLE PARACHUTE

Jacques Andre Istel and Lewis Barton Sanborn, Bedford, N.Y., assignors to Parachutes Incorporated, Bedford, N.Y., a corporation of New York Application August 5, 1957, Serial No. 676,176

6 Claims. (Cl. 244—145)

This invention relates to parachutes. More specifically, it pertains to non-oscillating, non-steerable parachutes for student use.

In recent years, parachuting has advanced from the status of beign solely a life-saving or an exhibition art to that of a world-wide competitive sport. Most countries of the world now have, or are in the process of forming, parachuting clubs or teams; parachuting competition is encouraged on both national and international levels. As a result of the increasing interest in sport parachuting, many governments and other interested parties have felt it necessary that rules and regulations be formed to govern the sport. Foremost among such regulations would be rules directed to the procedure followed in teaching students to jump. These regulations must be supplemented by equipment which has been specifically designed for the protection of the student jumper.

During the last half century, parachutes and parachuting equipment have undergone vast improvements. The present-day parachutes are now provided with many varied forms of safety features and are extremely dependable. In conjunction with the safety improvements, the parachute has undergone radical changes which affect the descent of the chute and the ability of the chutist to control the same. The present-day jumper, by merely manipulating the shroud lines of his parachute, can control his rate of descent, the speed of his forward momentum and the direction in which such descent is made. Such advances in parachuting technology are evidenced by the efficiency of military parachuting and the accuracy of competitive sport jumpers.

The parachutes, which form the basic equipment of the modern jumper, effectively serve military, exhibition and sport pumping purposes, but do not fulfill the needs of the novice jumper. Those parties who are interested in promoting sport jumping and in regulating the teaching of the art believe it is extremely desirable to fully control the novice in his early jumps. It is, of course, obvious that the instructor cannot control the student jumper when he has the ability to steer or control the descent of his own parachute. The modern parachutes, as aforementioned, are steerable and therefore are unsatisfactory for use in teaching. Steerable parachutes, as that term is used in this specification, refers to parachutes which may be controlled with respect to forward direction, but does not refer to rotatability. The elimination of the student's ability to control the descent of his own parachute might be accomplished by reverting to the earlier type, non-steerable, parachutes, but such action would raise an equally, if not more, difficult problem. The early parachutes had the tendency to oscillate during descent to such a degree that the jumper's ability to make a safe landing was greatly inhibited. Thus, with the obstacles of steerability and oscillation barring the way to safe parachute instruction, it has become evident that a new form of parachute is necessary.

This invention provides the required parachute and eliminates the problems aforementioned. By means of a redesigned canopy, a non-oscillating, non-steerable parachute is provided. It is, therefore, an object of this invention to provide a non-steerable parachute. It is also an object of the invention to provide a parachute which will not oscillate during descent.

Figure 2:
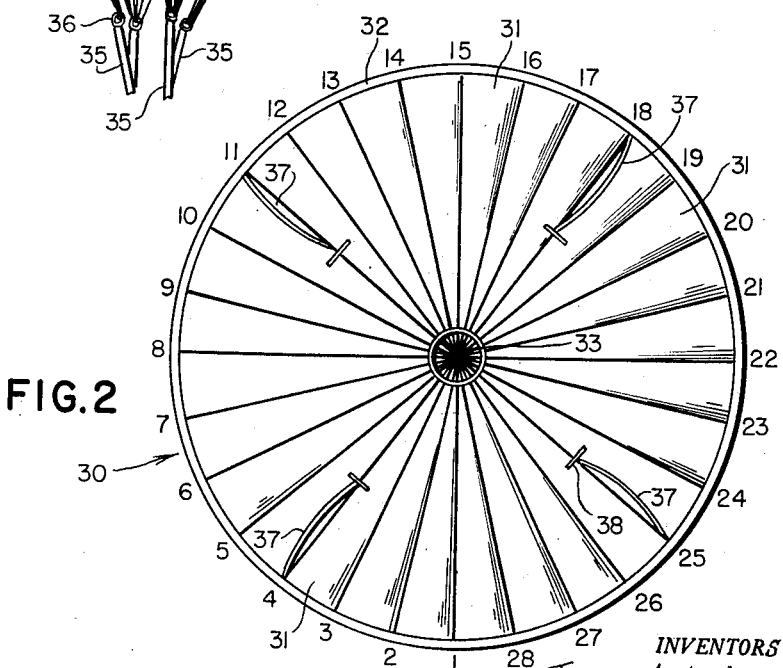

With this and other objects in mind, reference is had to the attached sheet of drawings, illustrating one form of the invention, wherein like characters represent like parts, and in which:

Fig. 1 is a perspective view of the parachute of this invention in inflated condition; and Fig. 2 is a top plan view of the parachute of this invention in inflated condition.

The oscillation of the parachute and parachute steerability are directly related to the action between the canopy and the air column down which the canopy descends. In descent, a parachute, much like an elevator, rides down a predetermined channel which is defined by the column of air directly beneath the canopy. It is, of course, obvious that as the parachute descends, the column of air is compressed beneath the canopy. Such compression acts to spill the air out of the canopy around its peripheral edge. If more air spills from one side of the canopy than the other, the parachute tends to swing in that direction; this swing is known as oscillation. In general parachuting practice, the oscillation aforedescribed is dampened by vigorously pulling down on the shroud lines on the high side or spilling side of the parachute as the body swings in that direction. As soon as the body starts its return swing, the shroud lines are released and the swing in the other direction is met by pulling down on the opposite shroud lines as the body comes up on that side. It should here be noted, that oscillation is extremely dangerous when the parachute is close to the ground and the difficulties in dampening such oscillation are increased manyfold. Therefore, the tendency to oscillate must be decreased as much as possible for the novice jumper.

It has been found that a parachute may be steered or controlled in descent by substantially simulating that which occurs during the oscillation of the parachute. If the jumper wishes the parachute to move to his right, he pulls down on the shroud lines at his right in such a manner that the air is spilled from the canopy at his left-hand side, such spilling causing the parachute to slip or move to the right. Conversely, movement to the left can be accomplished by pulling down on the left-hand shroud lines to spill the air from the right side of the canopy.

Steerability should not be confused with the rotatability of a parachute. It is highly desirable that a jumper, be he experienced or novice, be able to face in the direction in which he is landing. In order to accomplish this, the jumper must be able to rotate his parachute at will.

It should at this point be noted that a portion of the air compressed beneath the canopy is released therethrough by means of a puckered vent at the apex of the canopy. The release of this air tends to stabilize the parachute to a small degree and acts to prevent a rending of the parachute material or extremely violent oscillation. Further, a small percentage of the air contained within the canopy is permitted to pass through the canopy material. The amount of air which passes through the canopy material is dependent on the porosity of the material, the porosity being measured in cubic feet per square foot per minute. The velocity of the parachute's descent is related to the porosity of the canopy and the amount of air which is vented or spilled therefrom.

The parachute of the instant invention, by means of an improved type of canopy, substantially eliminates oscillation and prevents the jumper from controlling his direction of descent. Further, the improved canopy increases the rotatability of the parachute.

Referring now to the drawings, a canopy, generally indicated by the numeral 30 is shown. The canopy 30, which may conveniently be silk, nylon or pongee material, comprises a plurality of panels or gores 31. Each of the gores form a radial segment of the canopy and are secured together by reinforced seams indicated by the numerals 1 through 28. In the language of the parachuting art, each of the gores or panels 31 is identified and located with respect to the jumper by the seams defining the edges of the gores. Thus, the panel at the jumper's rear is defined as gore 1—28, while the panel at the jumper's front is defined as gore 14—15. The base portion of the panels 31 define the skirt or outermost edge 32 of the canopy, said edge being reinforced by any means known to the art. The apex of the panels 31 define the circumference of the apex or puckered vent 33 of the canopy which may be formed in any manner common to the art. In general practice, the puckered vent is provided with a circumferential, reinforced seam having housed therein a rubber or other flexible ring which is adapted to expand or contract to permit the venting of air from the canopy. Shroud lines 34 extend through the center of the puckered vent 33 outwardly of the canopy 30, at opposite sides thereof, through seams 1 to 28 for connection to risers 35. The shroud lines, by regulation, must extend uninterruptedly from a riser on one side of the canopy through the canopy to a riser on its opposite side. The shoud lines are secured to the risers 35 by means of connector links 36. In common practice, an equal number of shoud lines is secured to each riser strap. In the embodiment of the invention shown, there are 28 shroud lines, 7 secured to each of the risers 35. The risers 35 form part, or are secured to, a harness or other load-carrying device (not shown).

It is worthy of note that we have found it desirable to utilize canopy material having a porosity of about 50 cubic feet per square foot per minute; materials of this porosity tend to co-act with the venting means to be hereinafter described to slow the descent of the parachute and facilitate the operation thereof.

Four venting slits 37 have been provided in the canopy 30, one adjacent and parallel to each of the seams 4, 11, 18 and 25. It has been found desirable to provide the slits alternately on opposite sides of the seams. Thus, the venting slits 37 located respectively in gores 4—5 and 18—19 are on the same side of their associated seams, whereas venting slits 37 in gores 10—11 and 24—25, respectively, are located on the opposite side of their associated seams. The vents 37, which are merely cuts in the canopy material, are reinforced by tape or in any other manner known to the art and extend from the skirt 32 radially inwardly toward the apex of the canopy. The inner end of the vent 37 is reinforced to prevent extension of the slit by a reinforcing tape 38 extending transversely of the slit. It should here be noted that the venting slits 37 are positioned at approximately 45° angles from the jumper's front and rear, and that they extend substantially half the distance from the skirt to the apex of the canopy. It has been found that slits from 6 feet to 8 feet in length are most effective with a canopy having a 28-foot diameter.

In operation, the canopy of this invention dampens oscillation and provides for a more stable descent by equalizing the venting of the air therefrom. Slits 37 act to vent the air such that it is not spilled from the canopy around it periphery or skirt edge 32.

With respect to the non-steerable features of the parachute, we have found the explanation more difficult. It is our belief that the parachute formed with the instant canopy is non-steerable in that jumper's pulling downwardly on the right-hand shroud lines, to move to the right, opens the venting slits 37 at his left to permit the escape of the air therefrom, instead of spilling the air from that side of the canopy. In this manner, the air trapped within the canopy is permitted to escape upwardly through the venting slits 37, instead of spilling downwardly around the peripheral edge of the canopy, which downward movement would normally raise the side of the canopy and cause the parachute to move in the opposite direction. It is, of course, obvious that a downward pull on the shroud lines on any side of the canopy would tend to open the venting slits on the opposite side thereof and thus prevent a change in directional movement.

It has been found that the improvement in canopies, as above described, increases the rotatability of the parachute. Slow rotation to the right may be accomplished by pulling downwardly on the right rear riser and rotation of increased speed is accomplished by pulling downwardly on the right rear and left front risers simultaneously. Thus, in the first instance venting slit 37, formed in gore 24—25, will be forced into a closed position, while in the second instance this venting slit, as well as the venting slit formed in gore 10—11, will be closed. The downward pull on the risers tends to close the related vents, thus permitting the air deflection via the vents which remain open to turn the parachute. Naturally, various degrees of rotation are possible depending upon the extent of closing of the actuated venting slits 37. It is, of course, obvious that the parachute may be rotated to the left by a downward pull on the left rear and right front risers. In this connection, venting slits 37 disposed in gores 4—5 and 18—19, respectively, will be actuated towards a closed position. By means of the increased rotatability of the parachute, a jumper may quickly turn to face in the direction in which he is landing. Thus, among others, the several objects of the invention as aforenoted are achieved. Obviously, numerous changes in construction may be resorted to without departing from the spirit of the invention as defined by the claims.

We claim:

1. A non-oscillating, non-steerable and selectively rotatable parachute including a gored canopy being provided with four substantially evenly spaced venting slits, adjacent gores being separated by seams, said slits extending radially inwardly between the periphery of said canopy and the apex thereof, and each of said slits being adjacent one of said seams, and each of said slits being on the opposed side of its adjacent seam relative to the two adjacent slits spaced therefrom in either circumferentially extending direction.

2. A non-oscillating, non-steerable parachute as in claim 1, wherein said venting slits are of a length equal to substantially half the distance between the periphery of said canopy and the apex thereof.

3. A non-oscillating, non-steerable parachute as in claim 1, wherein said canopy possesses approximately a twenty-eight foot diameter and wherein said venting slits are between approximately six to eight feet in length.

4. A non-oscillating, non-steerable parachute as in claim 1, wherein said canopy has a porosity of about fifty cubic feet per square foot per minute.

5. A non-oscillating, non-steerable and selectively rotatable parachute including, in combination, a load-carrying harness, shroud lines secured to said harness, and a canopy, said canopy comprising a plurality of radially extending panels secured one to another, said shroud lines extending between said panels through said canopy and the apex thereof, and a plurality of evenly spaced radially extending venting slits formed in certain of said panels between the periphery and apex of said canopy, each of said slits being adjacent to and parallel to one of said shroud lines and adjacent slits being on opposed sides of their adjacent shroud lines.

6. A non-oscillating, non-steerable and selectively rotatable parachute including a gored canopy with adjacent gores separated by a seam, said canopy being provided with at least four spaced venting slits, said slits extending radially inwardly between the periphery of said canopy and the apex thereof, each of said slits being adjacent one of said seams, and two of said slits each being on the same side of their adjacent seams and on opposite sides of their adjacent seams relative to the location of two other slits with respect to their adjacent seams.

References Cited in the file of this patent

UNITED STATES PATENTS

| | | |
|---|---|---|
| 1,733,732 | Henvis | Oct. 29, 1929 |
| 1,777,441 | Malmer | Oct. 7, 1930 |
| 1,862,247 | Tricau | June 7, 1932 |
| 2,119,183 | Sedlmayr | May 31, 1938 |
| 2,384,416 | Derry | Sept. 4, 1945 |
| 2,483,423 | Maggi | Oct. 4, 1949 |

OTHER REFERENCES

Parachutes, by W. D. Brown, published 1951, published by Sir Isaac Pitman & Sons, Ltd., London; chapter 6, pages 55 through 58, inclusive.